United States Patent
Takaki et al.

(10) Patent No.: US 7,262,249 B2
(45) Date of Patent: *Aug. 28, 2007

(54) THERMOPLASTIC RESIN COMPOSITION HAVING IMPROVED IMPACT RESISTANCE

(75) Inventors: Akira Takaki, Hyogo (JP); Toshio Mizuta, Hyogo (JP); Akio Sato, Hyogo (JP)

(73) Assignee: Kaneka Corporation, Osaka (JP)

(*) Notice: Subject to any disclaimer, the term of this patent is extended or adjusted under 35 U.S.C. 154(b) by 303 days.

This patent is subject to a terminal disclaimer.

(21) Appl. No.: 10/475,286

(22) PCT Filed: Apr. 17, 2002

(86) PCT No.: PCT/JP02/03833

§ 371 (c)(1),
(2), (4) Date: Mar. 22, 2004

(87) PCT Pub. No.: WO02/085982

PCT Pub. Date: Oct. 31, 2002

(65) Prior Publication Data

US 2004/0171749 A1  Sep. 2, 2004

(30) Foreign Application Priority Data

Apr. 19, 2001 (JP) ............................... 2001-120783

(51) Int. Cl.
*C08F 8/00* (2006.01)
*C08L 33/04* (2006.01)
*C08L 35/02* (2006.01)
*C08L 33/18* (2006.01)

(52) U.S. Cl. ............... 525/193; 525/222; 525/232; 525/238; 525/239; 525/241

(58) Field of Classification Search ............... 525/193, 525/222, 232, 238, 239, 241
See application file for complete search history.

(56) References Cited

U.S. PATENT DOCUMENTS

| | | | |
|---|---|---|---|
| 3,670,052 A | 6/1972 | Saito et al. | |
| 6,306,961 B1* | 10/2001 | Tone et al. | 525/63 |
| 6,407,173 B1* | 6/2002 | Uemura et al. | 525/191 |
| 6,479,559 B1* | 11/2002 | Takai et al. | 521/54 |
| 6,605,672 B1 | 8/2003 | Takaki et al. | |
| 6,747,083 B2* | 6/2004 | Takaki et al. | 524/458 |
| 2004/0063814 A1* | 4/2004 | Miyatake et al. | 523/201 |
| 2004/0068034 A1* | 4/2004 | Takaki et al. | 523/335 |

FOREIGN PATENT DOCUMENTS

| | | |
|---|---|---|
| DE | 44 41 846 A1 | 5/1996 |
| GB | 1111089 A | 4/1968 |

OTHER PUBLICATIONS

Supplementary European Search Report from Application EP 02 72 0477, Nov. 7, 2006, 3 pages.

* cited by examiner

*Primary Examiner*—Nathan M. Nutter
(74) *Attorney, Agent, or Firm*—Brinks Hofer Gilson & Lione

(57) ABSTRACT

A thermoplastic resin composition comprising: a graft copolymer obtained by polymerizing 10 to 70 parts by weight of a monomer containing 60 to 100% by weight of at least one vinyl monomer selected from the group consisting of a (meth)acrylate ester compound, an aromatic vinyl compound and a vinyl cyanide compound and 0 to 40% by weight of a monomer which is copolymerizable therewith, in the presence of 30 to 90 parts by weight of hollow rubber particles which are rubber obtained by polymerizing a polymerization component comprising a butadiene without using a crosslinking agent and have a porosity of 3 to 90% in the form of a latex, wherein the total amount of the monomer and the rubber particles is 100 parts by weight; and a thermoplastic resin.

3 Claims, No Drawings

THERMOPLASTIC RESIN COMPOSITION HAVING IMPROVED IMPACT RESISTANCE

RELATED APPLICATIONS

This application is a nationalization of PCT Application No. PCT/JP02/03833 filed Apr. 17, 2002. This application claims priority from Japanese Patent Application No. 2001-120783 filed on Apr. 19, 2001.

TECHNICAL FIELD

The present invention relates to a resin composition comprising a rubber-containing graft copolymer and a thermoplastic resin, with the resin composition having excellent impact resistance.

BACKGROUND ART

Various conventional proposals have been made in order to improve the impact resistance of thermoplastic resins. For example, it is known that a copolymer containing a diene rubber or an acrylate rubber is incorporated in a vinyl chloride resin (JP-B-39-19035). In addition, for improving impact resistance, a process of increasing the particle size of a rubber component (JP-B-42-22541) and a process for lowering the glass transition temperature (hereinafter referred to as "Tg") of a rubber component (JP-A-2-1763, JP-A-8-100095) are proposed.

A technique was recently proposed for improving the impact resistance of a thermoplastic resin by using a graft copolymer having a Tg of 0 degree C. or less, containing 0.1 to 5% by weight of a crosslinking agent and containing a hollow rubber having a porosity of 3 to 90% in the form of a latex (WO00/02963).

However, the above-described processes are accompanied by such problems as a marked increase in the raw material cost, and insufficient improvement in a graft copolymer containing a butadiene rubber which has been most popularly used for the improvement of impact resistance.

Specifically, when the amount of the crosslinking agent is too small and becomes less than 0.1% by weight, the rubber particles are collapsed and finely dispersed upon molding or forming. As a result, no stress concentration occurs and the effects of improving impact resistance are not obtained.

Generally, a rubber-containing copolymer such as described above is mixed for improving impact resistance of a thermoplastic resin such as a vinyl chloride resin or the like. The stress concentration of a molded article and generation and expansion of voids in the rubber play an important role. For stress concentration, it is necessary to introduce a rubber component having a modulus much lower than that of the thermoplastic resin. In practice, various rubbers have been introduced and the size or shape of the rubber component has been optimized. It is predicted that generation and expansion of voids in a rubber contribute significantly to the growth of a shear yield to permit a large energy absorption amount upon impact test and would be expected to lead to an improvement of the impact resistance of a rubber-containing thermoplastic resin.

Therefore, it would be very important to learn how to accelerate generation and expansion of voids in the rubber component. Generation and expansion of voids in the rubber component upon impact on a molded article (under stress) depend much on the crosslinked condition of the rubber. When the rubber component is made hollow in advance, expansion of voids would easily proceed under stress.

DISCLOSURE OF THE INVENTION

The present inventors studied the relationship among void (hollow) state of the rubber component in the form of a latex, the hollow state of a molded article of a thermoplastic resin having a rubber-component-containing impact resistance modifier incorporated therein, and impact resistance of the molded article, while changing the amount of the crosslinking agent which controls the crosslinked state of the rubber component.

The present inventors have succeeded in preparing a resin composition which is excellent in impact resistance and which comprises a rubber-containing graft copolymer and a thermoplastic resin. The graft copolymer is obtained by polymerizing 10 to 70 parts by weight of a monomer composed of 60 to 100% by weight of at least one vinyl monomer selected from the group consisting of (meth) acrylate ester compounds, aromatic vinyl compounds and vinyl cyanide compounds, and 0 to 40% by weight of a monomer which is copolymerizable therewith. The graft copolymer is polymerized in the presence of 30 to 90 parts by weight of hollow rubber particles which are obtained by polymerizing, without a crosslinking agent, a polymerization component comprised primarily of butadiene and have a porosity of 3 to 90% in the form of a latex. The rubber containing graft copolymer is compounded with the thermoplastic resin.

The present inventors considered that it is important to realize stress concentration by introducing a rubber component having a modulus of elasticity much lower than that of a thermoplastic resin, such as a vinyl chloride resin, to be a continuous phase of a molded article. As a result, they have found that when a butadiene monomer is used as a rubber component, it is preferable that the content of the crosslinking agent for the rubber component is smaller; and when the crosslinking agent is not contained, the rubber particles become void upon impact (under stress) and impact resistance is most effectively improved. Thus, the present invention has been completed.

Specifically, the present invention relates to a thermoplastic resin composition which includes a graft copolymer obtained by polymerizing 10 to 70 parts by weight of a monomer containing 60 to 100% by weight of at least one vinyl monomer selected from the group consisting of a (meth)acrylate ester compound, an aromatic vinyl compound and a vinyl cyanide compound and 0 to 40% by weight of a monomer which is copolymerizable therewith, in the presence of 30 to 90 parts by weight of hollow rubber particles which are rubber obtained by polymerizing a polymerization component comprising a butadiene without using a crosslinking agent and have a porosity of 3 to 90% in the form of a latex, wherein the total amount of the monomer and the rubber particles is 100 parts by weight. The composition includes thermoplastic resin wherein the thermoplastic resin is a vinyl chloride resin comprising 50% by weight or more of vinyl chloride. Finally, in the resin composition the hollow rubber particles are obtained by using 0.5 to 20% by weight of a hydrophilic seed polymer having a particle size less than 0.04 µm.

BEST MODE FOR CARRYING OUT THE INVENTION

Hollow rubber particles can be synthesized by various processes. Examples of a well known process include (a) polymerization of a monomer of the O layer in an W/O/W emulsion (O: oleophilic, W: hydrophilic), (b) swelling of core-shell particles having an expandable core at Tg or more of the shell layer to thereby make the inside of the particles hollow, (c) two-stage polymerization of polymers different in solubility parameter, (d) preparation of an O/W emulsion by finely dispersing, in water, a polymerizable monomer containing a crosslinkable monomer and a hydrophilic monomer and an oily substance, and removal of the oily substance by polymerization of the monomer; and (e) a process using transfer of a carboxylic acid which has been copolymerized in the particles, under acid or alkali conditions (Application of Synthetic Latex, by Takaaki Sugimura, et al., p. 285). The rubber particles of the present invention having a hollow in the form of a latex can be prepared by any one of these processes.

In the present invention, a butadiene monomer containing no crosslinking agent is polymerized with a seed polymer having a low molecular weight and a certain level of hydrophilicity to obtain a hollow rubber latex having rubber particles filled, inside thereof, with water. Then the resulting rubber latex is polymerized with 10 to 70 parts by weight of a monomer mixture containing 60 to 100% by weight of at least one vinyl monomer selected from the group consisting of (meth)acrylate ester compounds, aromatic vinyl compounds and vinyl cyanide compounds and 0 to 40% by weight of a monomer copolymerizable therewith to thereby obtain a graft copolymer. A resin composition comprising the resulting graft copolymer and a thermoplastic resin, which has an excellent impact resistance, is obtained.

The seed polymer has used in the present invention has, as a skeleton, rubber such as diene rubber, acrylic rubber, silicone rubber, olefin rubber or the like; a semi-rigid polymer such as a butyl acrylate-styrene copolymer, ethyl acrylate-styrene copolymer or the like, or a rigid polymer such as a styrene-methyl methacrylate copolymer or the like, and contains a chain transfer agent such as t-dodecylmercaptan, n-dodecylmercaptan or the like. A small amount of acrylic or methacrylic acid may be incorporated therein in order to control its hydrophilicity.

The seed polymer preferably has a particle size less than 0.04 µm. Particle sizes of 0.04 µm or more make it difficult to heighten the porosity of the hollow butadiene rubber in the form of a latex. Although there is no lower limit, a particle size of about 0.005 µm is the lowest limit which can be measured. The seed polymer is preferably added in an amount of 0.5 to 20% by weight based on 100% by weight of the hollow rubber particles including the seed polymer. Amounts less than 0.5% by weight make it difficult to heighten the porosity of the hollow butadiene rubber in the form of a latex, while those exceeding 20% by weight dilute the butadiene rubber to thereby lower its impact resistance improving effects.

In the hollow butadiene rubber usable in the present invention, the polymerization component having butadiene as a main component except a seed polymer may be 100% by weight butadiene or a copolymer of butadiene with 50% by weight or less of a non-crosslinkable copolymerizable vinyl monomer. The butadiene is preferably 70% by weight to 100% by weight, more preferably 90% by weight to 100% by weight, based on the total amount of the polymerization component except a seed polymer.

It is preferable that the rubber is a rubber elastomer having a Tg of 0 degree C. or less, and that the Tg is lower. Examples thereof satisfying such conditions include butadiene rubber, styrene-butadiene rubber, acrylonitrile-butadiene rubber and the like.

The void of the hollow butadiene rubber in the form of a latex can be confirmed by embedding the rubber latex in an epoxy resin or the like, dyeing it with ruthenium tetraoxide or the like and observing it with TEM. The porosity can be calculated by precisely determining the particle size of the rubber latex by "Microtrac UPA" and then measuring the light scattering intensity of the same rubber latex. The porosity of the hollow rubber in the form of a latex is 3 to 90%, preferably 10 to 60%, from the viewpoint of the impact resistance improving effects of the end molded article. At a porosity exceeding 90%, the rubber particles is apt to collapse upon molding or forming and impact resistance cannot be improved stably. At a porosity less than 3%, on the other hand, generation and enlargement of voids in the rubber do not proceed smoothly upon impact and impact resistance improving effects of the end molded article are not sufficient.

In order to allow the end molded article to exhibit the maximum impact resistance improving effects, it is preferred to set the optimum particle size of the graft copolymer of the present invention within 0.05 to 2.0 mu·m, though it varies depending on the kind of the thermoplastic resin. Particle sizes outside the above-described range tend to lower the impact resistance improving effects.

Although the synthesizing method of the hollow butadiene rubber is not particularly limited, it can be synthesized efficiently by emulsion polymerization.

The graft copolymer of the present invention is obtained by polymerizing 10 to 70 parts by weight, preferably 12 to 40 parts by weight, of a monomer in the presence of 30 to 90 parts by weight, preferably 60 to 88 parts by weight, of a hollow butadiene rubber component. Amounts of the hollow rubber component less than 30 parts by weight do not bring about sufficient impact resistance improving effects, while those exceeding 90 parts by weight cause collapse of the particles of the impact resistance modifier upon formation of a molded article containing it to thereby lower the impact resistance improving effects.

The monomer to be polymerized in the presence of the hollow rubber particles is a monomer or monomer mixture containing 60% by weight or more of at least one selected from a (meth)acrylate ester, an aromatic vinyl compound, a vinyl cyanide compound and vinyl chloride. Examples of the (meth)acrylate ester include methyl methacrylate, ethyl methacrylate, butyl methacrylate, 2-ethylhexyl methacrylate, methyl acrylate, ethyl acrylate, butylacrylate, 2-ethylhexyl acrylate and the like. Examples of the aromatic vinyl compound include styrene, alpha-methylstyrene, chlorostyrene and the like. Examples of the vinyl cyanide compound include acrylonitrile, methacrylonitrile and the like.

Examples of another copolymerizable monomer include a (meth)acrylate ester, other than the above-described (meth) acrylate esters, such as glycidyl (meth)acrylate and the like, and a maleimide compound such as maleimide, N-phenyl-maleimide and the like.

Examples of the thermoplastic resin of the present invention include a vinyl chloride resin, an acrylic resin, a styrene resin, a carbonate resin, an amide resin, an ester resin, an olefin resin and the like. Examples of the vinyl chloride resin include polyvinyl chloride, a copolymer containing at least 50% by weight of vinyl chloride and a monomer such as vinyl acetate, ethylene or the like which is copolymerizable with vinyl chloride, a chlorinated vinyl chloride resin and the like. Examples of the acrylic resin include poly(methyl methacrylate), a copolymer containing at least 50% by weight of methyl methacrylate and a monomer, such as methyl acrylate, butyl acrylate, styrene or the like, which is copolymerizable with methyl acrylate, and the like. Examples of the styrene resin include polystyrene, a styrene-acrylonitrile copolymer, an alpha-methylstyrene-acrylonitrile copolymer, a styrene-maleimide copolymer, a styrene-alpha-methylstyrene-acrylonitrile copolymer, a styrene-alpha-methylstyrene-maleimide-acrylonitrile copolymer, a styrene-maleic anhydride copolymer and the like. Examples of the carbonate resin include a bisphenol polycarbonate, an aliphatic polycarbonate and the like. Examples of the amide resin include nylon 6, nylon 6-6, nylon 12 and the like. Examples of the ester resin include polyethylene terephthalate, polybutylene terephthalate and the like. Examples of the olefin resin include polypropylene, polyethylene, cyclic polyolefin and the like. Based on 100 parts of any one of these thermoplastic resins, 1 to 50 parts by weight of the graft copolymer containing a hollow rubber is added. Among the above-described thermoplastic resins, a vinyl chloride resin have markedly high impact resistance improving effect.

The present invention will hereinafter be described in further detail based on Examples. However, the present invention is not limited thereto.

EXAMPLE 1

After mixing 200 parts by weight of water and 30 parts by weight of sodium oleate, the mixture was heated to 70 degree C. After its temperature reached 70 degree C., nitrogen substitution was conducted. A mixture of 9 parts by weight of butyl acroylate, 1 part by weight of acrylonitrile and 3 parts by weight of t-dodecylmercaptan was then added. Thirty minutes thereafter, 0.5 part by weight (as a solid content) of a 2% aqueous potassium persulfate solution was added, followed by polymerization for 1 hour. A mixture of 81 parts by weight of butyl acrylate, 9 parts by weight of acrylonitrile and 27 parts by weight of t-dodecylmercaptan was continuously added over 3 hours. Two hours thereafter, polymerization was conducted to obtain seed latex (S-1) having an average particle size of 0.015 mu·m. In a pressure polymerizer, 2 parts by weight (as a solid content) of seed latex (S-1), 0.4 part by weight of tripotassium phosphate, 0.2 part by weight of Na salt of a beta-naphthalinesulfonic acid-formalin condensate, 0.016 part by weight of ferrous sulfate ($FeSO_4$ $7H_2O$), 0.04 part by weight of ethylenediaminetetraacetic acid 2Na salt and 0.5 part by weight of sodium oleate were mixed. To the resulting mixture were added 98 parts by weight of butadiene. After the liquid temperature was adjusted to 40 degree C., 0.2 part by weight of paramethane hydroperoxide and 0.4 part by weight of sodium formaldehyde sulfoxylate were added, followed by polymerization at 40 degree C. Each of 2 hours and 5 hours after the initiation of the polymerization, 0.7 part by weight of sodium oleate was added, each of 2 hours and 7 hours after the initiation of the polymerization, 0.2 part by weight of paramethane hydroperoxide was added, and polymerization was conducted for 20 hours. As a result, hollow butadiene rubber latex (R-1) having a porosity of 50% and particle size of 0.08 mu·m was obtained.

After heating 77.5 parts by weight (as a solid content) of rubber latex (R-1) to 60 degree C., 0.0016 part by weight of ferrous sulfate ($FeSO_4.7H_2O$), 0.004 part by weight of ethylenediaminetetraacetic acid 2Na salt and 0.2 part by weight of sodium formaldehyde sulfoxylate were added, and a mixture of 16.5 parts by weight of methyl methacrylate, 3 parts by weight of butyl acrylate, 3 parts by weight of styrene and 0.01 part by weight of cumene hydroperoxide over 3 hours was continuously added. Post polymerization was conducted for 1 hour to obtain graft copolymer latex (G-1) having an average particle size of 0.9 mu·m.

The graft copolymer latex (G-1) was coagulated with hydrochloric acid, followed by heat treatment, dehydration and drying, to thereby obtain powdery graft copolymer (A-1).

In a blender, 8 parts by weight of graft copolymer (A-1), 2 parts by weight of dioctyl tin mercaptide, 0.8 part by weight of polyol ester, 0.2 part by weight of diol ester of montanic acid and 100 parts by weight of a vinyl chloride resin (average polymerization degree: 700) were mixed to thereby obtain a powdery resin composition. The resulting resin composition was kneaded for 5 minutes by a roll of 160 degree C., followed by pressurization for 10 minutes by a press at 190 degree C., to thereby obtain a molded article of 5.0 mm thick. From the molded article, a test piece of JIS NO.2 A for Izod impact resistance test was made. Izod impact resistance of the test piece was measured and results are shown in Table 1.

EXAMPLE 2

After mixing 200 parts by weight of water and 7 parts by weight of sodium oleate, the mixture was heated to 70 degree C. After its temperature reached 70 degree C., nitrogen substitution was conducted. A mixture of 9 parts by weight of butyl acrylate, 1 part by weight of acrylonitrile and 3 parts by weight of t-dodecylmercaptan was then added. Thirty minutes thereafter, 0.5 part by weight (as a solid content) of a 2% aqueous potassium persulfate solution was added, followed by polymerization for 1 hour. A mixture of 81 parts by weight of butyl acrylate, 9 parts by weight of acrylonitrile and 27 parts by weight of t-dodecyl mercaptan was continuously added over 3 hours. Post polymerization was conducted for 2 hours to obtain seed latex (S-2) having an average particle size of 0.025 mu·m. In a pressure polymerizer, 2 parts by weight (as a solid content) of seed latex (S-2), 0.4 part by weight of tripotassium phosphate, 0.2 part by weight of Na salt of a beta-naphthalinesulfonic acid-formalin condensate, 0.016 part by weight of ferrous sulfate ($FeSO_4$ $7H_2O$), 0.04 part by weight of ethylenediaminetetraacetic acid. 2Na salt and 0.5 part by weight of sodium oleate were mixed. To the resulting mixture were added 98 parts by weight of butadiene. After the liquid temperature was lowered to 40 degree C., 0.2 part by weight of paramethane hydroperoxide and 0.4 part by weight of sodium formaldehyde sulfoxylate were added, followed by polymerization at 40 degree C. Each of 2 hours and 5 hours after the initiation of the polymerization, 0.7 part of sodium oleate was added, each of 2 hours and 7 hours after the initiation of the polymerization, 0.2 part of paramethane hydroperoxide was added, followed by polymerization for 20 hours. As a result, hollow butadiene rubber latex (R-2) having a porosity of 30% and particle size of 0.12 mu·m was obtained.

Synthesis, coagulation, heat treatment, dehydration, drying into powder, blending, molding and evaluation were conducted in the same manner as in Example 1, except for using (R-2) instead of (R-1). Results are shown in Table 1.

COMPARATIVE EXAMPLE 1

In a pressure polymerizer, 0.4 part by weight of tripotassium phosphate, 0.2 part by weight of Na salt of a beta-naphthalinesulfonic acid-formalin condensate, 0.002 part by weight of ferrous sulfate ($FeSO_4$ $7H_2O$), 0.004 part by weight of ethylenediaminetetraacetic acid 2Na salt and 1.9 part by weight of sodium oleate were mixed. To the resulting mixture was added 100 parts by weight of butadiene. After adjusting the liquid temperature to 40 degree C., 0.1 part by weight of paramethane hydroperoxide and 0.1 part by weight of sodium formaldehyde sulfoxylate were added and polymerization was started at 40 degree C. Each of 5 hours and 10 hours after the initiation of the polymerization, 0.1 part by weight of paramethane hydroperoxide was added and polymerization was conducted for 20 hours. As a result, butadiene rubber latex (R-11) having a particle size of 0.08 mu·m was obtained.

After heating 77.5 parts by weight (as a solid content) of rubber latex (R-11) to 60 degree C., 0.0016 part by weight of ferrous sulfate (FeSO$_4$ 7H$_2$O), 0.004 part by weight of ethylenediaminetetraacetic acid 2Na salt and 0.2 part by weight of sodium formaldehyde sulfoxylate were added, and then a mixture of 16.5 parts by weight of methyl methacrylate, 3 parts by weight of butyl acrylate, 3 parts by weight of styrene and 0.01 part by weight of cumene hydroperoxide over 3 hours was continuously added. Post polymerization was conducted for 1 hour to obtain graft copolymer latex (G-11) having an average particle size of 0.9 mu·m.

The graft copolymer latex (G-11) was subjected to coagulation, heat treatment, dehydration, drying into powder, blending, molding and evaluation in the same manner as in Example 1 and the results are shown in Table 1.

COMPARATIVE EXAMPLE 2

Synthesis, post treatment, molding and evaluation were conducted in the same manner as in Comparative Example 1, except that the amount of sodium oleate used for polymerization of a butadiene rubber was changed to 1.2 parts by weight. The results are shown in Table 1.

COMPARATIVE EXAMPLE 3

Synthesis, coagulation, heat treatment, dehydration, drying into powder, blending, molding and evaluation were conducted in the same manner as in Example 1, except that 0.5 part by weight of allyl methacrylate was added as a crosslinking agent upon polymerization of a butadiene rubber. The results are shown in Table 1.

COMPARATIVE EXAMPLE 4

Synthesis, coagulation, heat treatment, dehydration, drying into powder, blending, molding and evaluation were conducted in the same manner as in Example 1, except that 1.0 part by weight of allyl methacrylate was added as a crosslinking agent upon polymerization of a butadiene rubber. The results are shown in Table 1.

COMPARATIVE EXAMPLE 5

Synthesis, coagulation, heat treatment, dehydration, drying into powder, blending, molding and evaluation were conducted in the same manner as in Example 1, except that 3.0 parts by weight of allyl methacrylate was added as a crosslinking agent upon polymerization of a butadiene rubber. The results are shown in Table 1.

TABLE 1

| | EX. 1 | EX. 2 | Comp. EX. 1 | Comp. EX. 2 | Comp. EX. 3 | Comp. EX. 4 | Comp. EX. 5 |
| --- | --- | --- | --- | --- | --- | --- | --- |
| Graft copolymer Rubber | Hollow rubber | Hollow rubber | Conventional rubber | Conventional rubber | Hollow rubber | Hollow rubber | Hollow rubber |
| Seed diameter (mu.m) | 0.015 | 0.025 | | | 0.015 | 0.015 | 0.015 |
| Seed amount (parts by wt.) | 2 | 2 | | | 2 | 2 | 2 |
| Rubber cross linking agent ALMA(%) | 0 | 0 | 0 | 0 | 0.5 | 1 | 3 |
| Rubber porosity(%) | 50 | 30 | 0 | 0 | 45 | 45 | 40 |
| Rubber particle size(mu.m) | 0.08 | 0.12 | 0.08 | 0.12 | 0.08 | 0.08 | 0.08 |
| Graft particle size(mu.m) | 0.09 | 0.14 | 0.09 | 0.14 | 0.09 | 0.09 | 0.09 |
| Izod impact resistace of molded article(23 degree C.) Kg/cm/cm$^2$ | 13 | 30 | 8 | 18 | 8 | 6 | 5 |

ALMA: allyl methacrylate

The Izod impact resistance of a molded article tends to be higher when the particle size of a graft copolymer becomes larger. When the particle size is same, a graft copolymer containing a butadiene rubber which is hollow in the form of a latex exhibits high Izod impact resistance. Even a graft copolymer containing a butadiene rubber which is hollow in the form of a latex has lowered Izod impact resistance when a crosslinking agent is contained in the rubber so that it is preferred not to use the crosslinking agent.

INDUSTRIAL APPLICABILITY

The present invention relates to a resin composition comprising a rubber-containing graft copolymer and a thermoplastic resin and having excellent impact resistance.

The invention claimed is:

1. A thermoplastic resin composition comprising:
a graft copolymer and a thermoplastic resin, the graft copolymer being obtained by polymerizing monomers in a presence of hollow rubber particles; the monomers accounting for 10 to 70 parts by weight of the graft polymer, and containing a vinyl monomer and another monomer; the vinyl monomer accounting for 60 to 100% by weight of the monomers and being selected from the group consisting of a (meth)acrylate ester compound, an aromatic vinyl compound and a vinyl cyanide compound, and the other monomer accounting for 0 to 40% by weight of the monomers and being copolymerizable therewith;
the hollow rubber particles accounting for 30 to 90 parts by weight of the graft copolymer having a porosity of 3 to 90% in a form of a latex, and being obtained by polymerizing a polymerization component without using a crosslinking agent, the polymerization component comprising a butadiene.

2. The thermoplastic resin composition according to claim 1, wherein the thermoplastic resin is a vinyl chloride resin comprising 50% by weight or more of vinyl chloride.

3. The thermoplastic resin composition according to claim 1, wherein the hollow rubber particle is obtained from the hydrophilic seed polymer having a particle size less than 0.04 µm, the hydrophilic seed polymer accounting for 0.5 to 20% by weight based on 100% by weight of the hollow rubber particle including the seed hydrophilic polymer.

* * * * *